United States Patent
Okuno

(10) Patent No.: US 12,340,494 B2
(45) Date of Patent: Jun. 24, 2025

(54) CHIP DETECTION APPARATUS, MACHINE TOOL, CHIP DETECTION METHOD, AND LEARNING IMAGE COMPOSITION APPARATUS

(71) Applicant: DMG MORI CO., LTD., Nara (JP)

(72) Inventor: Junichiro Okuno, Sapporo (JP)

(73) Assignee: DMG MORI CO., LTD., Nara (JP)

( * ) Notice: Subject to any disclaimer, the term of this patent is extended or adjusted under 35 U.S.C. 154(b) by 902 days.

(21) Appl. No.: 17/433,873

(22) PCT Filed: Feb. 20, 2020

(86) PCT No.: PCT/JP2020/006748
§ 371 (c)(1),
(2) Date: Mar. 31, 2022

(87) PCT Pub. No.: WO2020/175308
PCT Pub. Date: Sep. 3, 2020

(65) Prior Publication Data
US 2022/0237767 A1    Jul. 28, 2022

(30) Foreign Application Priority Data
Feb. 25, 2019 (JP) .................. 2019-031127

(51) Int. Cl.
*B23Q 11/00* (2006.01)
*B23Q 17/24* (2006.01)
*G06T 7/00* (2017.01)

(52) U.S. Cl.
CPC ........ *G06T 7/0004* (2013.01); *B23Q 11/0042* (2013.01); *B23Q 17/2409* (2013.01);
(Continued)

(58) Field of Classification Search
CPC ........................................ B23Q 11/0042–0075
See application file for complete search history.

(56) References Cited

U.S. PATENT DOCUMENTS

| | | | |
|---|---|---|---|
| 2018/0267489 A1* | 9/2018 | Tango | G05B 19/406 |
| 2020/0020108 A1* | 1/2020 | Pao | G06T 7/90 |

(Continued)

FOREIGN PATENT DOCUMENTS

| | | | |
|---|---|---|---|
| JP | H03184747 A | 8/1991 | |
| JP | H07108435 A | 4/1995 | |

(Continued)

OTHER PUBLICATIONS

International Search Report with an English translation dated Apr. 21, 2020 for Application No. PCT/JP2020/006748.
(Continued)

*Primary Examiner* — Barbara D Reinier
(74) *Attorney, Agent, or Firm* — DiPerna Law Firm, P.C.; Raymond A. DiPerna

(57) ABSTRACT

To easily and accurately detect chips produced when processing a work by a machine tool, there is provided a chip detection apparatus for detecting chips produced when processing a work by a machine tool. The chip detection apparatus includes a mesh divider that performs processing of dividing, into a plurality of mesh images in a predetermined mesh size, at least part of an area image obtained by capturing a target area where the chips are to be detected, and a chip information determiner that determines chip information concerning the chips for each of the mesh images using a determination parameter preset for determining the chip information.

12 Claims, 12 Drawing Sheets

(52) U.S. Cl.
CPC .............. *G06T 2207/20021* (2013.01); *G06T 2207/20081* (2013.01); *G06T 2207/30108* (2013.01); *G06T 2207/30141* (2013.01)

(56) References Cited

U.S. PATENT DOCUMENTS

| | | | | |
|---|---|---|---|---|
| 2023/0043666 | A1* | 2/2023 | Inoue | B23Q 17/249 |
| 2023/0049354 | A1* | 2/2023 | Okuno | B23Q 17/2433 |

FOREIGN PATENT DOCUMENTS

| | | | |
|---|---|---|---|
| JP | 2004265252 A | | 9/2004 |
| JP | 2007114994 A | | 5/2007 |
| JP | 2015026369 A | | 2/2015 |
| JP | 2016120580 A | | 7/2016 |
| JP | 2016191979 A | | 11/2016 |
| JP | 2017094420 A | | 6/2017 |
| JP | 2017107455 A | | 6/2017 |
| JP | 2018001288 A | | 1/2018 |
| JP | 2018024094 A | | 2/2018 |
| JP | 2018097506 A | | 6/2018 |
| JP | 2018156317 A | | 10/2018 |
| JP | 2019016249 A | * | 1/2019 |
| WO | 2011036892 A1 | | 3/2011 |
| WO | 2017078072 A1 | | 5/2017 |

OTHER PUBLICATIONS

First Japanese Office Action with an English translation dated Sep. 24, 2020 for Application No. JP 2020-542668.
Second Japanese Office Action with an English translation dated Feb. 21, 2021 for Application No. JP 2020-542668.
Third Japanese Office Action with an English translation dated Aug. 4, 2021 for Application No. JP 2020-542668.
Second Japanese Office Action with an English translation dated Feb. 2, 2021 for Application No. JP 2020-542668.

\* cited by examiner (i) WHEN THERE IS NO OVERLAPPING PORTION IN BOUNDARY PORTION BETWEEN EACH PARTIAL IMAGE AND ANOTHER PARTIAL IMAGE (ii) WHEN THERE IS OVERLAPPING PORTION IN BOUNDARY PORTION BETWEEN EACH PARTIAL IMAGE AND ANOTHER PARTIAL IMAGE

CORRECTED MESH IMAGE

CORRECTED MESH IMAGE

CORRECTED MESH IMAGE

CHIP DETECTION APPARATUS, MACHINE TOOL, CHIP DETECTION METHOD, AND LEARNING IMAGE COMPOSITION APPARATUS

RELATED APPLICATIONS

This application is an application under 35 U.S.C. 371 of International Application No. PCT/JP2020/006748 filed on Feb. 20, 2020, which is based upon and claims the benefit of priority from Japanese patent application No. 2019-031127, filed on Feb. 25, 2019, the disclosures of each of which are incorporated herein in their entireties by reference.

TECHNICAL FIELD

The present invention relates to a chip detection apparatus that detects chips produced when processing a work by a machine tool, a machine tool, a chip detection method, a learning image composition apparatus, and the like.

BACKGROUND ART

Conventionally, chips produced when processing a work by a machine tool damage the work at the time of processing, or decrease an operating ratio due to a processing failure, an operation failure of a machine, and an unintended operation stop. To cope with this, as a technique of automatically detecting chips produced during processing and removing them, for example, Japanese Patent Laid-Open No. 7-108435 discloses a chip removal apparatus that loads an image of a table and a work and detects the positions of chips (patent literature 1).

CITATION LIST

Patent Literature

Patent literature 1: Japanese Patent Laid-Open No. 7-108435

SUMMARY OF THE INVENTION

Technical Problem

However, chips produced during processing are different in shape, color, size, gathering status, and the like due to differences in processing conditions, tools used, materials of works, and the like, and thus there are a myriad of variations of chips. Furthermore, with respect to an in-machine environment as the background of an image, there are conditions of a structure, a position, the types of a work and a jig, the presence/absence of a coolant (cleaning liquid), illuminance, and the like, and thus there exist various patterns of combinations of the conditions.

Therefore, if chips are to be detected from one entire image, as in patent literature 1, the image includes many chips and in-machine environments in various combinations in a complex manner. Consequently, it is difficult to detect each chip precisely and accurately by image processing, and an enormous calculation amount and time are required to perform image processing for detecting all chips.

Solution to Problem

The present invention provides a chip detection apparatus, a machine tool, a chip detection method, a learning image composition apparatus, and the like.

To solve the problem of easily and accurately detecting chips produced when processing a work by a machine tool, a chip detection apparatus according to one example aspect of the present invention is a chip detection apparatus for detecting chips produced when processing a work by a machine tool, comprising a mesh divider that performs processing of dividing, into a plurality of mesh images in a predetermined mesh size, at least part of an area image obtained by capturing a target area where the chips are to be detected, and a chip information determiner that determines chip information concerning the chips for each of the mesh images using a determination parameter preset for determining the chip information.

Advantageous Effects of Invention

According to the present invention, it is possible to easily detect chips produced when processing a work by a machine tool.

DESCRIPTION OF EXAMPLE EMBODIMENTS

An example embodiment of a chip detection apparatus, a machine tool including it, and a chip detection method will be described below with reference to the accompanying drawings.

Figure 1:
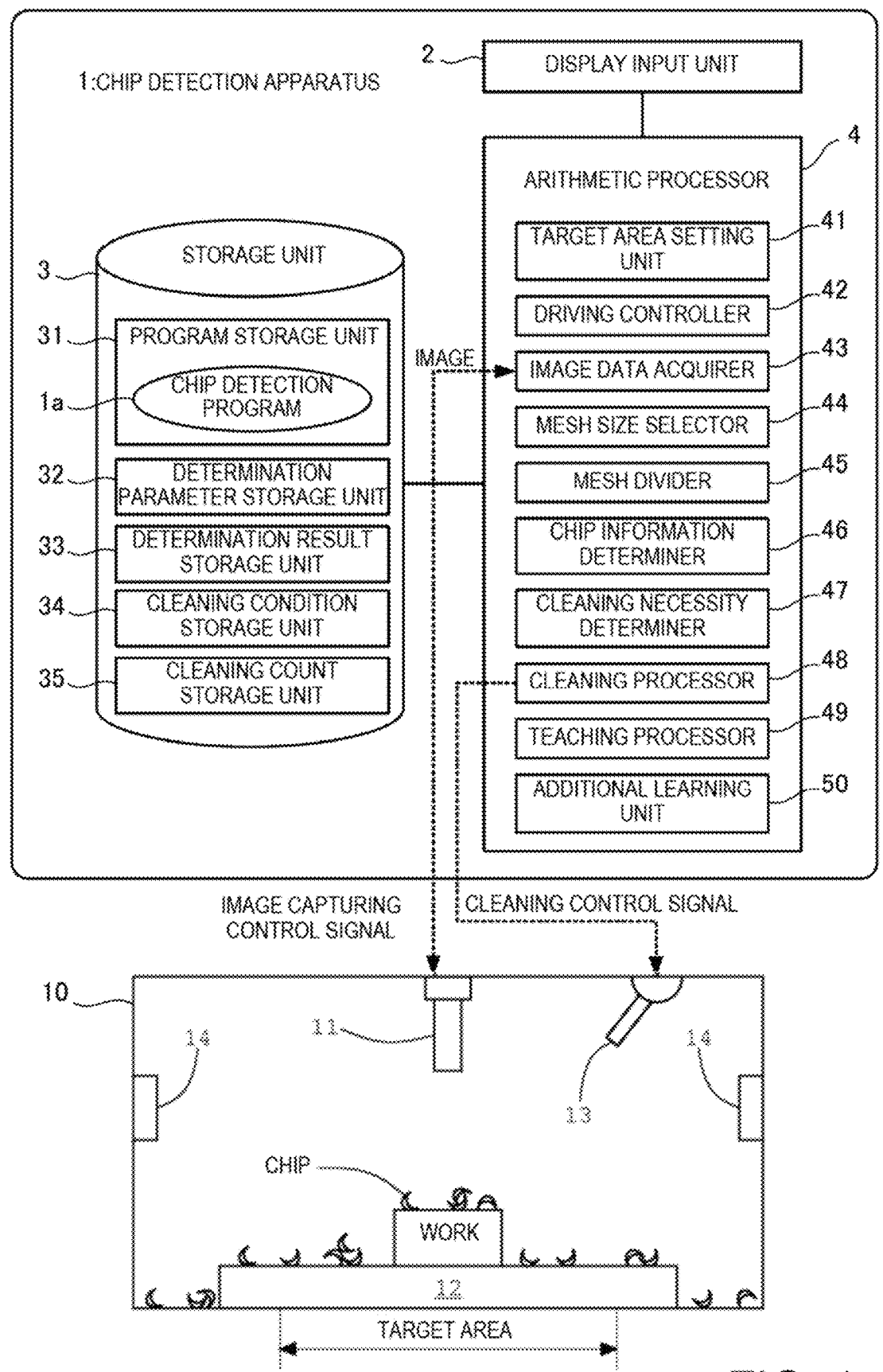
FIG. 1 is a block diagram showing an example embodiment of a chip detection apparatus and a machine tool including it.
Figure 2:
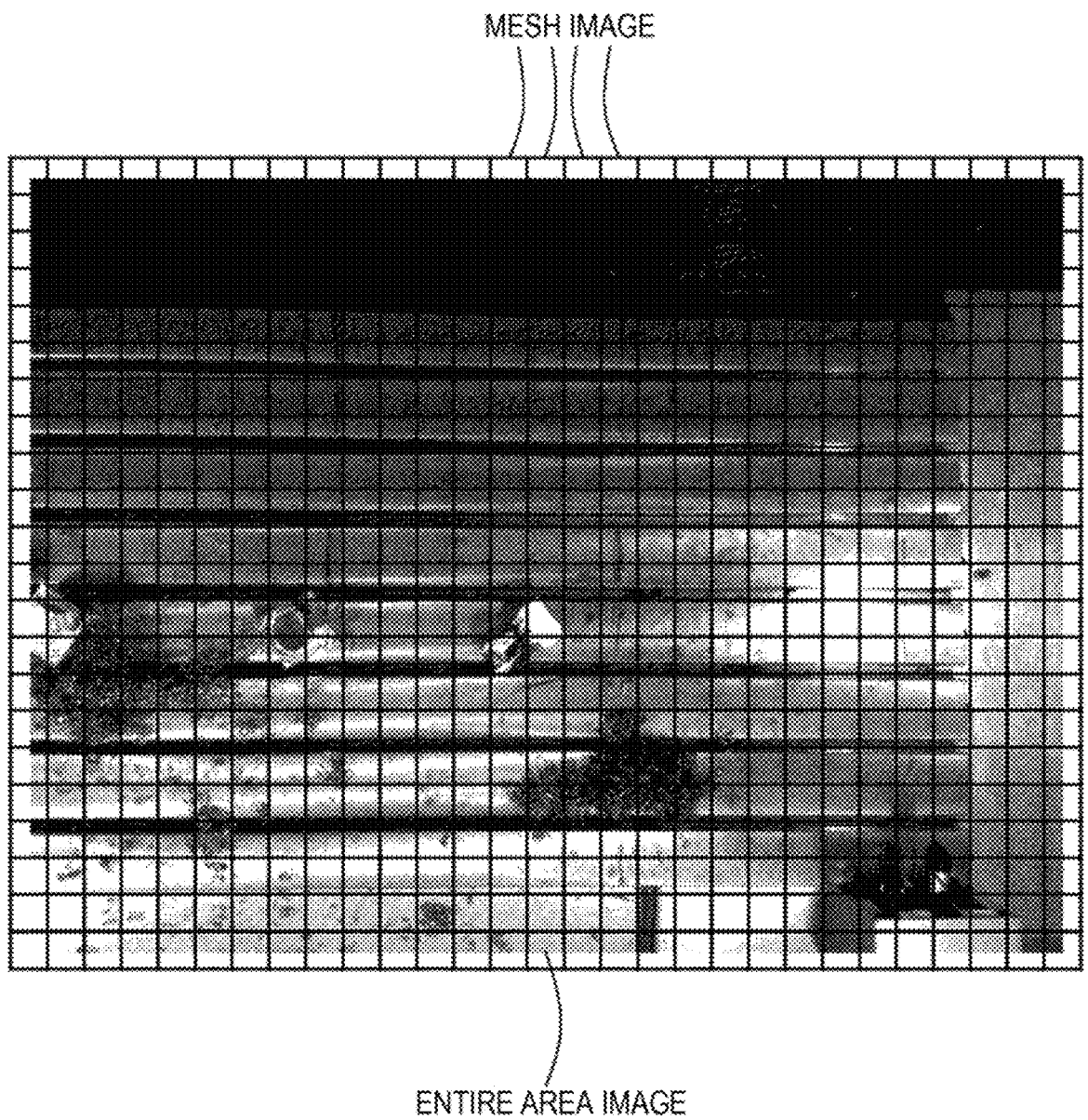
FIG. 2 is a view showing a state in which an area image is divided into a plurality of mesh images according to the example embodiment.

A chip detection apparatus 1 according to this example embodiment detects chips produced when processing a work by a machine tool 10. More specifically, as shown in FIG. 1, the chip detection apparatus 1 controls an image capturer 11 provided in the machine tool 10 to acquire an image of a target area where the chips are to be detected. Then, as shown in FIG. 2, the image is divided into a plurality of mesh images, and chip information concerning the chips is determined for each of the mesh images. Each component will be described in detail below.

Note that in the present invention, the chip information is a concept including information detectable with respect to the chips, such as the presence/absence of chips, an amount of chips, the shapes of chips, the type of chips, and a combination thereof. In this example embodiment, as will be described later, a "class" indicating the ease of chip cleaning is determined as the chip information.

The machine tool 10 is a machine for performing processing such as cutting or grinding for a work such as a metal, wood, stone, or a resin. In this example embodiment, the machine tool 10 is numerically controlled in accordance with a driving signal output from a numerical control apparatus serving as the chip detection apparatus 1. In this example embodiment, the chip detection apparatus 1 and the numerical control apparatus of the machine tool are formed by the same apparatus but the present invention is not limited to this. A computer different from the machine tool may be used as the chip detection apparatus 1. As shown in FIG. 1, the machine tool 10 includes the image capturer 11 that captures the inside of the machine, a table 12 on which a work is placed, a cleaner 13 that cleans the chips, and an illuminator 14 that illuminates the inside of the machine.

The image capturer 11 captures the target area where the chips are to be detected. In this example embodiment, the image capturer 11 is formed by a camera (to be referred to as an ATC camera hereinafter) detachable from the main shaft of the machine tool 10 by an ATC (Automatic Tool Changer) like a jig. Then, the image capturer 11 captures an area image that covers the preset target area at a preset image capturing timing in accordance with an image capturing control signal from an image data acquirer 43 (to be described later).

Note that in this example embodiment, the ATC camera detachable from the main shaft of the machine tool is used as the image capturer 11 in consideration of a merit that the ATC camera need not be installed in the machine and a time during which the ATC camera is exposed to coolant mist or the like is relatively short. Since the ATC camera can be attached to the main shaft of the machine tool, if the main shaft of the machine tool is moved, the camera can accordingly be moved. Therefore, it is possible to readily change the image capturing range and image capturing direction of the camera. Since it is possible to readily change the image capturing range and image capturing direction of the camera, the ATC camera is exemplified. However, the present invention is not limited to this. One or a plurality of fixed cameras may be installed in the machine. This arrangement has a merit that the image capturing time is relatively short and it is possible to perform image capturing even during processing.

Figure 3:
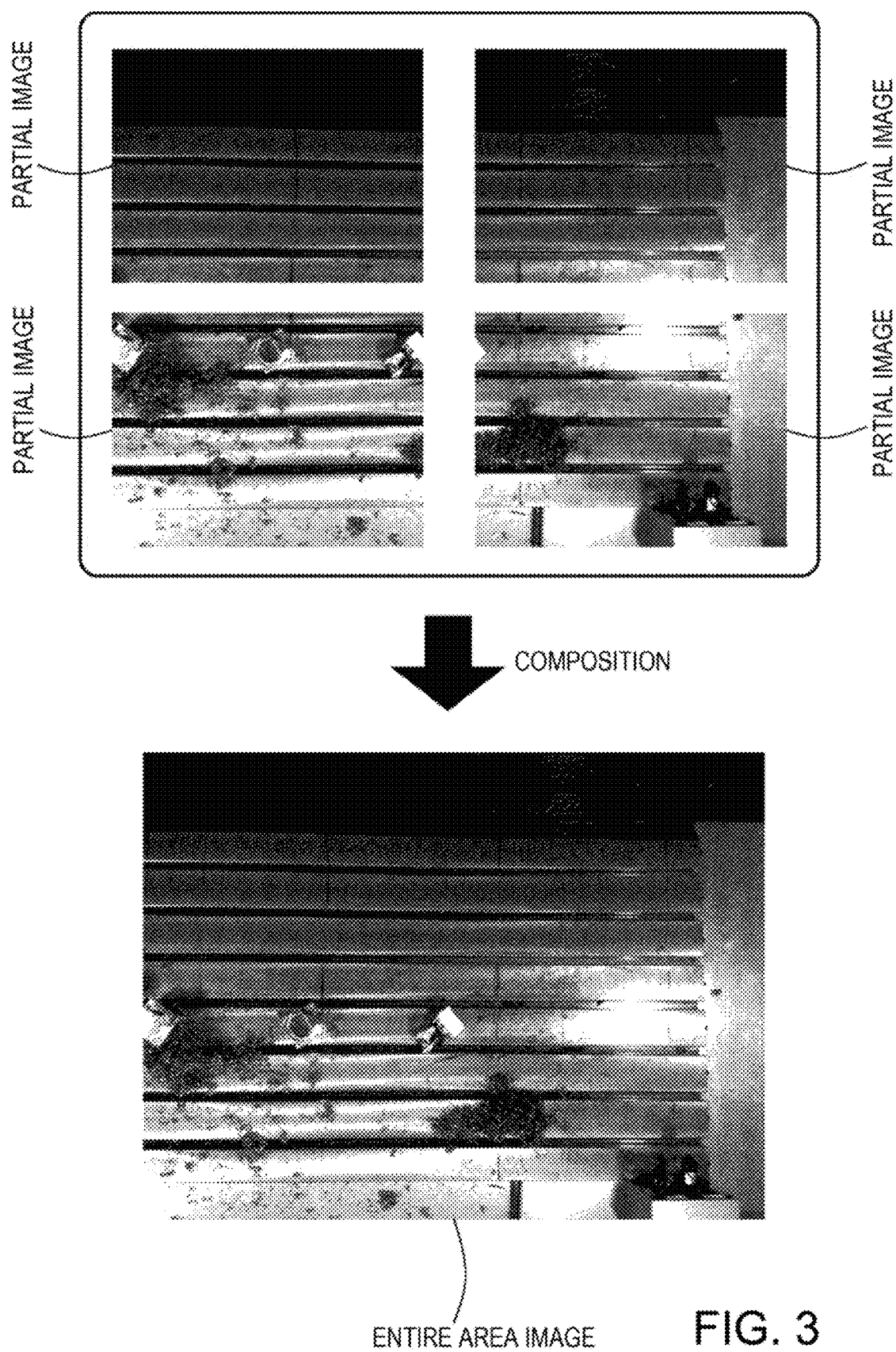
FIG. 3 is a view showing a state in which a plurality of partial images are composited to form an area image according to the example embodiment.

If the angle of view of the image capturer 11 is smaller than the target area, when the ATC camera is used, a plurality of partial images are captured while moving the main shaft, and when the fixed cameras are used, a plurality of partial images are captured by the plurality of fixed cameras, as shown in FIG. 3. Then, the partial images may be composited to form an entire area image that covers the entire target area.

The cleaner 13 cleans the chips generated by processing of a work to remove them. In this example embodiment, the cleaner 13 is formed by a programmable nozzle that can control the ejection direction of a cleaning liquid. Then, the cleaning liquid such as a coolant liquid is ejected to a desired area on the work or the table 12 in accordance with a cleaning control signal from a cleaning processor 48 (to be described later).

Note that this example embodiment uses the programmable nozzle as the cleaner 13 but the present invention is not limited to this. For example, a plurality of cleaning nozzles whose ejection directions are fixed may be installed to cover the entire target area, and the cleaning nozzle near an area that needs to be cleaned may be made to eject the cleaning liquid.

The illuminator 14 illuminates the inside of the machine so as to facilitate detection of the chips. In this example embodiment, as shown in FIG. 1, the illuminator 14 is formed by a programmable light that is fixed in the machine, and can control ON/OFF switching, brightness, an irradiation direction, and the like. However, the present invention is not limited to this, and a light belonging to the ATC camera may be used. To suppress reflection by illumination, the illuminator 14 may be rotated or a polarizing filter may be attached to the camera lens of the image capturer 11.

Next, the chip detection apparatus 1 is formed by a computer such as a numerical control apparatus that controls the machine tool 10, and mainly includes, as shown in FIG. 1, a display input unit 2 that is used to input an instruction by a user and display a determination result, a storage unit 3 that stores various kinds of data and functions as a working area when an arithmetic processor 4 performs arithmetic processing, and the arithmetic processor 4 that functions as each component (to be described later) by executing a chip detection program 1a installed in the storage unit 3 to execute various arithmetic processes. Each component will be described in detail below.

Note that although this will be repetitive, the chip detection apparatus may be an apparatus different from the numerical control apparatus that controls the machine tool 10. The chip detection apparatus includes a mesh divider that performs processing of dividing, into a plurality of mesh images in a predetermined mesh size, at least part of the area image obtained by capturing the target area where the chips are to be detected, and a chip information determiner that determines chip information concerning the chips for each of the mesh images using a determination parameter preset for determining the chip information.

The display input unit 2 is formed by a touch panel, and has an input function of accepting an instruction input from the user and a display function of displaying the determination result of the chips and the like. Note that in this example embodiment, the touch panel is adopted as the display input unit 2. The present invention, however, is not limited to this, and the display input unit 2 may individually include a display unit having only the display function and an input unit having only the input function.

The storage unit 3 is formed by a hard disk, a ROM (Read Only Memory), a RAM (Random Access Memory), a flash memory, and the like, and includes a program storage unit 31, a determination parameter storage unit 32, a determination result storage unit 33, a cleaning condition storage unit 34, and a cleaning count storage unit 35, as shown in FIG. 1.

In the program storage unit 31, the chip detection program 1a for controlling the chip detection apparatus 1 of this example embodiment is installed. Then, when the arithmetic processor 4 executes the chip detection program 1a, the chip detection apparatus 1 as the computer is made to function as each component (to be described later).

Note that the usage mode of the chip detection program 1*a* is not limited to the above arrangement. For example, the chip detection program 1*a* may be stored in a computer-readable non-transitory recording medium such as a CD-ROM or USB memory, and may then be read out directly from the recording medium and executed. Furthermore, the chip detection program 1*a* may be used from an external server or the like in a cloud computing method or ASP (Application Service Provider) method.

The determination parameter storage unit 32 stores the determination parameter preset for determining the chip information concerning the chips. In this example embodiment, as will be described later, a chip determination model obtained by applying a learning parameter to a learning/inference model as a machine learning algorithm is adopted as an algorithm for determining the chip information. Therefore, a learning parameter obtained by prior learning using supervised data formed from a set of the mesh image and the chip information is stored as a determination parameter.

In this example embodiment, as will be described later, a mesh size selector 44 that selects the mesh size of the mesh image is provided. Therefore, the determination parameter storage unit 32 stores the learning parameter as the determination parameter for each of a plurality of different mesh sizes. Note that in this example embodiment, a hyperparameter that influences the feature such as the learning efficiency of the chip determination model is additionally set in the determination parameter storage unit 32.

The determination result storage unit 33 stores, as a determination result, the chip information determined for each mesh image. In this example embodiment, with respect to each of the mesh images, a chip information determiner 46 (to be described later) determines, for each class indicating the ease of chip cleaning, the probability of the class as the chip information.

If, for example, three classes of "class 0" indicating no chip, "class 1" indicating a few chips, and "class 2" indicating many chips are set, a probability P0 of "class 0", a probability P1 of "class 1", and a probability P2 of "class 2" are determined. Thus, the determination result storage unit 33 stores the probabilities P0, P1, and P2 of the above-described classes as a determination result in association with each mesh image.

Note that the determination result is not limited to the probabilities of the respective classes, and a class whose probability is highest may simply be stored as the determination result. Furthermore, as the number of classes increases, determination is more difficult, and the performance is more difficult to improve. Thus, it is preferable to set a few classes. As the simplest example of the classes, there are provided two classes of "class 0" indicating the absence of chips and "class 1" indicating the presence of chips.

The cleaning condition storage unit 34 stores a cleaning condition for determining whether chip cleaning is necessary. In this example embodiment, a condition obtained by combining the probabilities of the respective classes and the position of a mesh area corresponding to each mesh image is set as a cleaning condition. For example, if the above-described three classes are set, an efficient, high-performance determination algorithm is implemented by evaluating cleaning conditions (1) to (4) below in descending order.

(1) The maximum value of P0, P1, and P2 is P2: cleaning
(2) P1+P2≥99% is satisfied: cleaning
(3) The mesh area is on the table 12 and P1+P2≥P0 is satisfied: cleaning
(4) None of conditions (1) to (3) above are satisfied: non cleaning Note that in this example embodiment, a cleaning condition obtained by combining the chip information and the position of the mesh area is set. The present invention, however, is not limited to this, and a cleaning condition is set using the chip information. For example, if the above-described most simplified two classes are set, a cleaning condition may be set to perform no cleaning for class 0 (the absence of chips) and perform cleaning for class 1 (the presence of chips) regardless of the position of the mesh area.

The cleaning count storage unit 35 stores a cleaning count as the number of times of continuous cleaning of chips. In this example embodiment, the cleaning count storage unit 35 stores a continuous cleaning count as the number of times of continuous cleaning in the target area and a local continuous cleaning count as the number of times of continuous cleaning of the same mesh area. Then, a situation in which an automatic cleaning operation never ends is avoided using these cleaning counts, as will be described later.

Next, the arithmetic processor 4 is formed by a CPU (Central Processing Unit) and the like, and functions as a target area setting unit 41, a driving controller 42, the image data acquirer 43, the mesh size selector 44, a mesh divider 45, a chip information determiner 46, a cleaning necessity determiner 47, the cleaning processor 48, a teaching processor 49, and an additional learning unit 50, as shown in FIG. 1, by executing the chip detection program 1*a* installed in the storage unit 3. Each component will be described in more detail below.

The target area setting unit 41 sets a target area where chips are to be detected. In this example embodiment, the target area setting unit 41 sets an arbitrary target area like the inside of the whole machine, an area on the table 12, an area on a protector, the periphery of the work, or some or a combination of these in response to an instruction input by the user using the display input unit 2.

Note that in this example embodiment, the target area setting unit 41 sets a target area manually by the user. The present invention, however, is not limited to this, and the target area setting unit 41 may automatically set a target area. More specifically, the target area setting unit 41 may acquire the shape of the work in each processing step with reference to a processing program, and automatically set a target area to include the entire work or automatically set only an area on a processing path as a target area.

The driving controller 42 drives and controls the motor of each shaft provided in the machine tool 10. In this example embodiment, the driving controller 42 generates a driving control signal for causing the machine tool 10 to execute cutting processing or the like based on the processing program, and outputs the driving control signal to the motor of each shaft. Furthermore, if the ATC camera is used as the image capturer 11, the driving controller 42 controls the ATC (Automatic Tool Changer) (not shown) to replace the tool by the ATC camera.

The image data acquirer 43 acquires an image of the entire area of the target area. In this example embodiment, the image data acquirer 43 outputs an image capturing control signal to the image capturer 11 at a preset image capturing timing, and acquires an image of the entire area. If the image capturer 11 acquires a partial image smaller than the target area, the image data acquirer 43 causes the image capturer 11 to capture a plurality of partial images so as to cover the target area, and composites the partial images, thereby acquiring an image of the entire area.

Note that the image capturing timing may be arbitrarily, manually set by the user or may be automatically set in accordance with a predetermined setting condition. As the setting condition, a timing between steps, a timing of tool replacement, a predetermined time interval, a timing at which a predetermined processing amount is reached, or the like is used. Note that the processing amount can be estimated from the processing program or the like.

The mesh size selector 44 selects a mesh size to be used when dividing the image of the entire area into a plurality of mesh images. In this example embodiment, based on a predetermined reference, the mesh size selector 44 selects one or a plurality of mesh sizes as candidates from preset mesh sizes.

Note that the present invention simplifies chip detection and improves its accuracy by dividing the image of the entire area into mesh images. To do this, the mesh size is an important factor that influences the accuracy of chip detection, and it is preferable to consider the following features of the chips when selecting the mesh size.

More specifically, as described above, since there are various variations and patterns of chips, there are no completely identical chips on a two-dimensional image. However, edges (ridgelines) forming the outer shape of the chips have a common feature that they are relatively complex and irregular. Then, the feature is not lost even in a state in which many chips are deposited and folded and thus individual shapes cannot be recognized.

On the other hand, the work and the jig serving as the background of the chips have almost no irregularity unlike the chips, and have simple edge shapes, as compared to the chips in the same scale. Therefore, in this example embodiment, based on the sizes of the chips, work, and jig, the mesh size selector 44 preferably selects a mesh size such that the shapes of the chips can be recognized and such that the edge shapes of the work and jig as the background of the chips in a mesh image are simplified. By selecting such mesh size, the edge shapes of the work and jig and the chips are readily identified, thereby reducing erroneous detection.

Note that the mesh size selector 44 is not limited to the above-described arrangement, and the user may manually select one of a plurality of preset mesh sizes. Since, however, in a chip determination model for determining chip information, the mesh size needs to be fixed, if a plurality of mesh sizes are prepared, a chip determination model obtained by performing learning using the mesh image of each mesh size is necessary. On the other hand, if the mesh size used is always fixed, it is unnecessary to provide the mesh size selector 44.

The mesh divider 45 performs processing of dividing the area image into a plurality of mesh images. In this example embodiment, the mesh divider 45 generates a plurality of mesh images by dividing the area image acquired by the image data acquirer 43 in the mesh size selected by the mesh size selector 44. Note that in this example embodiment, a mesh in a checkerboard pattern or a grid pattern is adopted, as shown in FIG. 2. The present invention, however, is not limited to this, and a rhombus, triangle, or honeycomb may be adopted. Furthermore, in this example embodiment, the entire area image is divided into mesh images. The present invention, however, is not limited to this, and only at least part of the area image may be divided without dividing an area where chip detection is unnecessary. A captured image obtained by capturing an area and grid-pattern mesh information may separately be saved in association with each other. That is, the mesh divider 45 is not limited to generation of individual mesh images, and may superimpose the captured image and grid information on each other and process, as mesh regions, regions of the captured image divided by the grid. In this case, the mesh regions correspond to the above-described mesh images.

Figure 4:
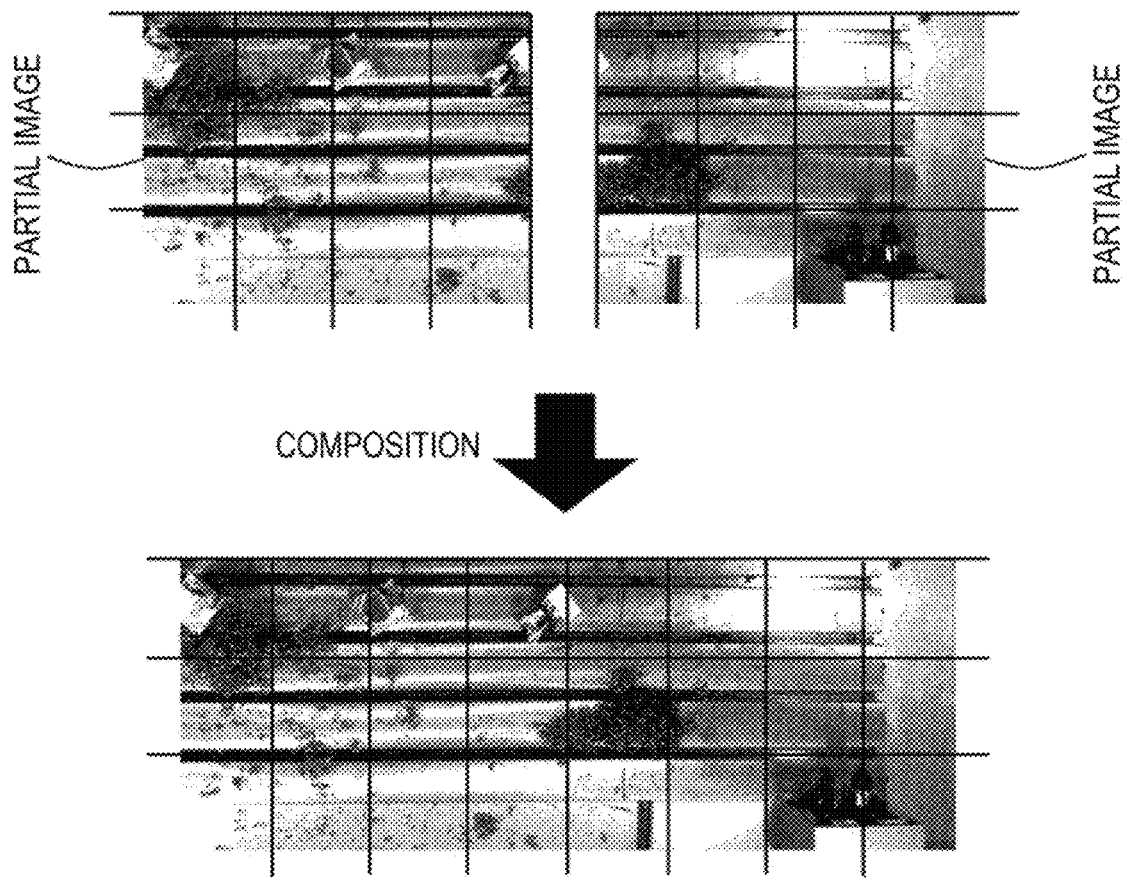
FIG. 4 is a view showing division processing by a mesh divider according to the example embodiment.

Furthermore, in this example embodiment, if the image data acquirer 43 composites a plurality of partial images to acquire an area image, the mesh divider 45 executes one of the following processes when performing division processing, as shown in FIG. 4.

(i) If there is no overlapping portion in a boundary portion between a partial image and another partial image, the boundary of each mesh image is made to coincide with the boundary of each partial image.

(ii) If there is an overlapping portion in a boundary portion between a partial image and another partial image, a mesh image including the boundary portion is extracted from only one of the partial images.

When the mesh divider 45 executes the processing of (i) or (ii) above, a plurality of different partial images are not mixed in the same mesh image. Therefore, erroneous detection caused by a difference in brightness between the partial images, a positional shift, or the like can be reduced.

The chip information determiner 46 determines chip information for each of the mesh images. In this example embodiment, the chip information determiner 46 determines, using the determination parameter read out from the determination parameter storage unit 32, chip information for each of the mesh images having undergone the division processing by the mesh divider 45, and saves the chip information in the determination result storage unit 33.

Figure 5:
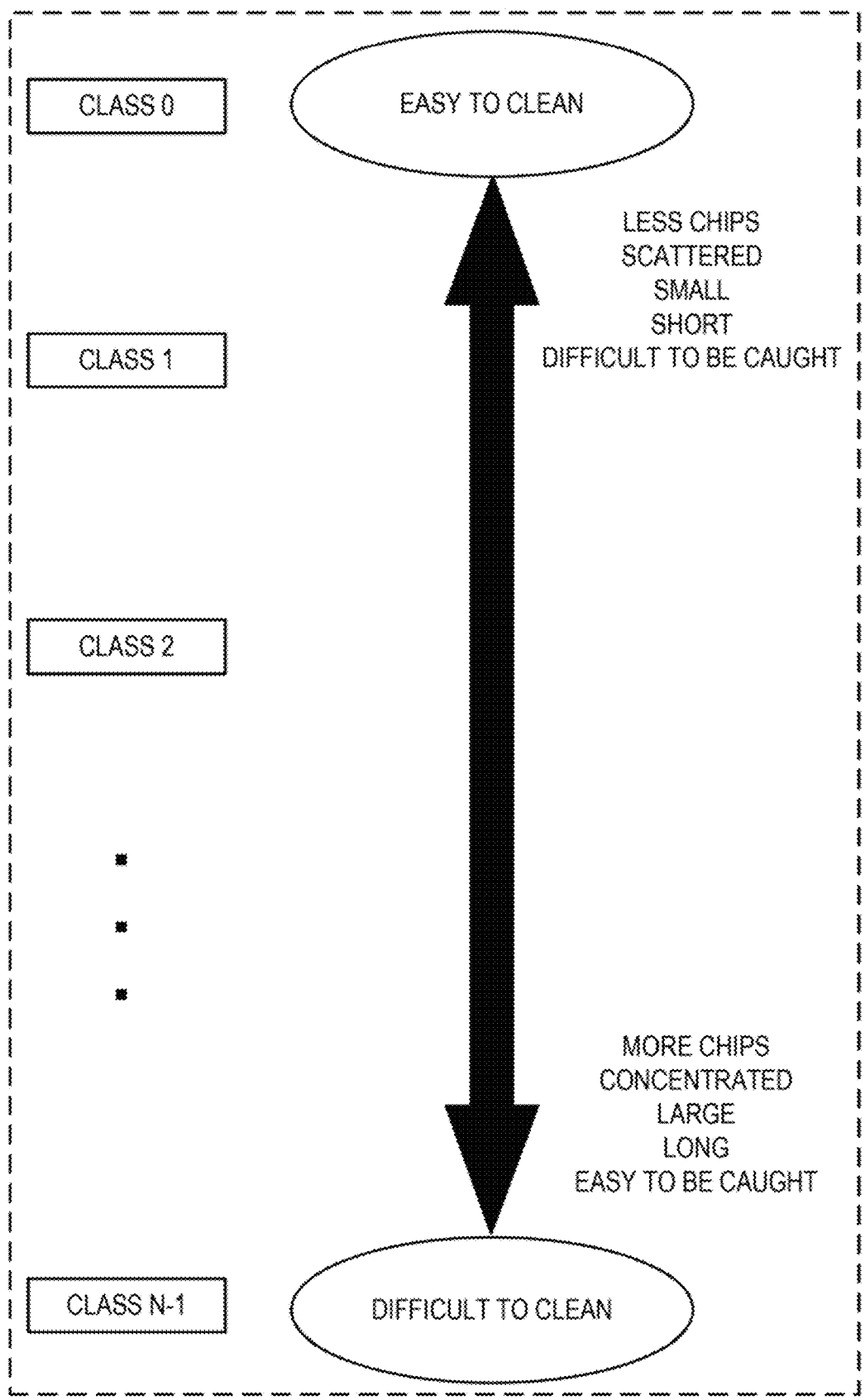
FIG. 5 is a view for explaining a "class" as chip information according to the example embodiment.

Furthermore, in this example embodiment, the chip information determiner 46 determines, as chip information, a "class" indicating the ease of chip cleaning. This class is decided by comprehensively considering the amount, density, sizes, lengths, shapes, and the like of the chips. More specifically, as shown in FIG. 5, as the chips are easier to clean since, for example, there are less chips and the chips are scattered, small, short, and difficult to be caught, the chips are classified into a lower class, and as the chips are more difficult to clean since, for example, there are more chips and the chips are concentrated, large, long, and easy to be caught, the chips are classified into a higher class.

In this example embodiment, the chip information determiner 46 is formed by the chip determination model obtained by applying the learning parameter to the learning/inference model as a machine learning algorithm. More specifically, among deep learning methods relatively resistant against environmental changes, a CNN (Convolutional Neural Network) as a model specialized in class classification of an image is used.

Figure 6:
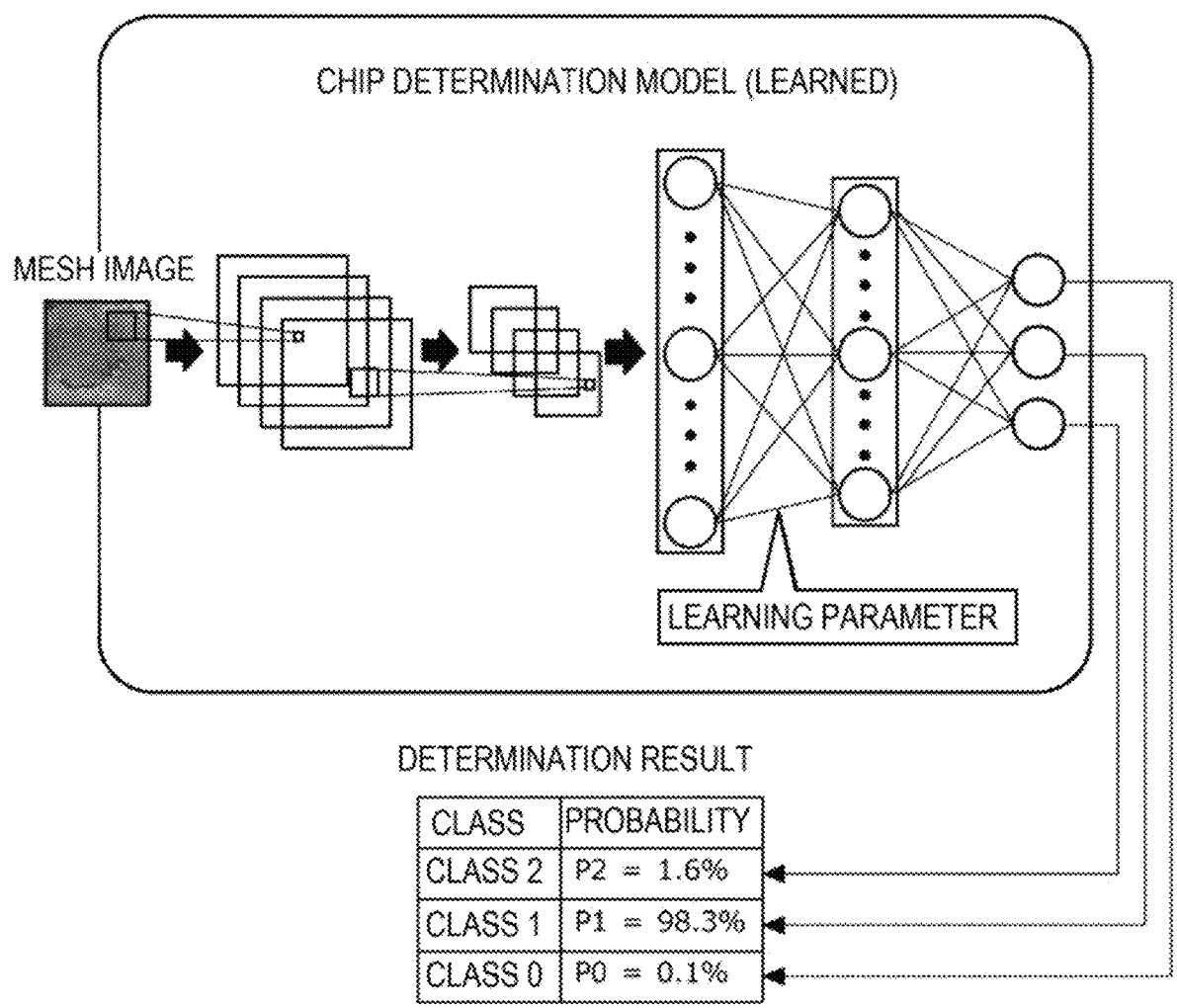
FIG. 6 is a view showing determination processing by a chip determination model according to the example embodiment.

If chip information is determined using the above-described chip determination model, the chip information determiner 46 first executes, for each mesh image, preprocessing for improving the determination accuracy such as noise removal processing or image size conversion processing. Next, the chip information determiner 46 outputs, for each mesh image, the probabilities of the classes as chip information by inputting the mesh image to the learned chip determination model applied with the learning parameter prepared in advance in the determination parameter storage unit 32, as shown in FIG. 6.

Note that in this example embodiment, the convolutional neural network is adopted as a machine learning algorithm. The present invention, however, is not limited to this, and another machine learning algorithm may be used. For example, if a machine learning algorithm using input data other than an image, like SVM (Support Vector Machine), is used, filtering processing or the like is executed for each mesh image to calculate a shape feature amount of each mesh image. Then, the shape feature amount may be input to the learned chip determination model, thereby determining a class for each mesh image.

Figure 7:
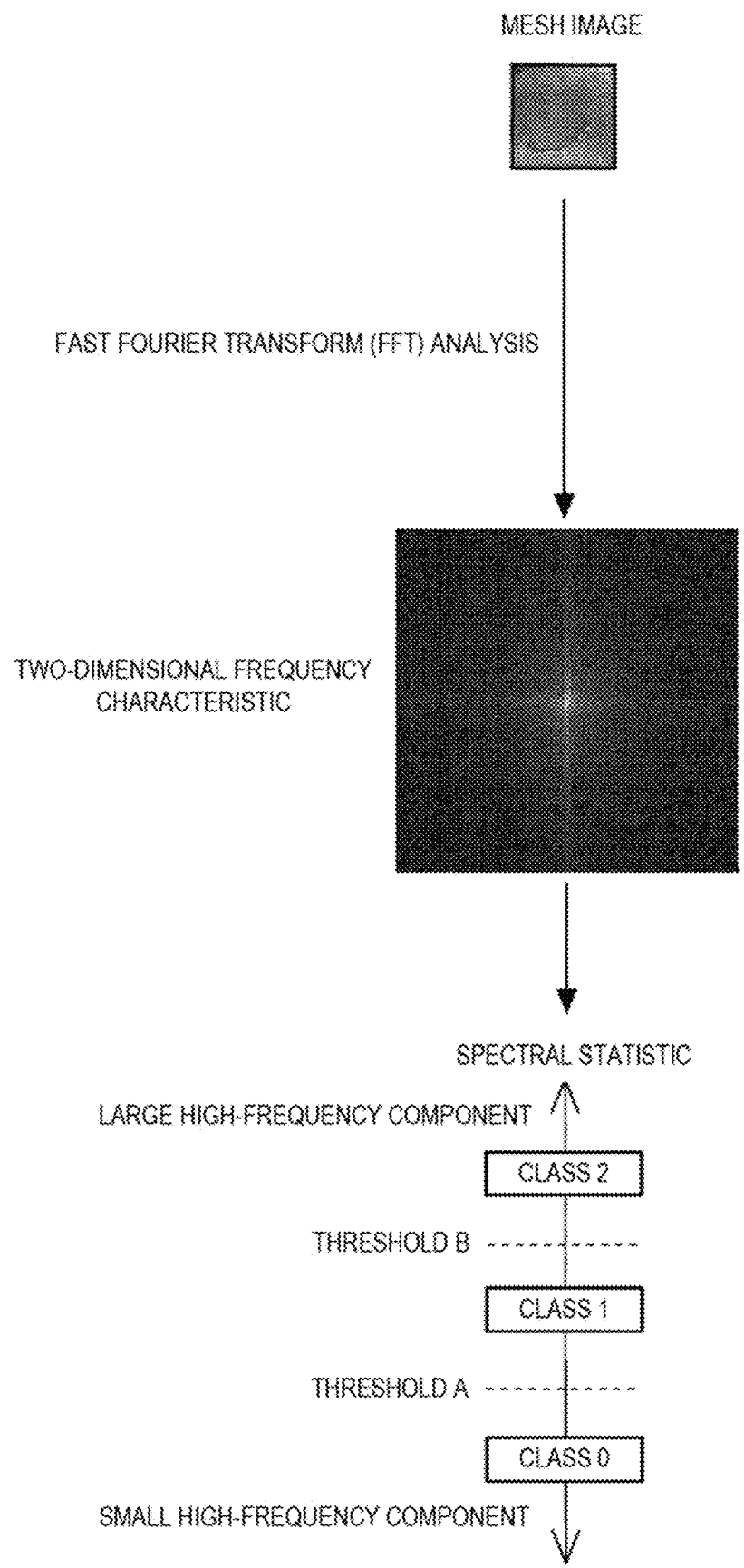
FIG. 7 is a view showing an example of the feature amount of a mesh image calculated by a chip information determiner adopting a non-machine learning algorithm.

In addition, in this example embodiment, the machine learning algorithm is adopted as the chip information determiner 46. The present invention, however, is not limited to this, and a non-machine learning algorithm such as a deterministic algorithm may be used. For example, as there are more chips, the mesh image is more complex, and tends to have more high image frequency components. To cope with this, as shown in FIG. 7, the chip information determiner 46 executes frequency analysis such as FFT (Fast Fourier Transform) to calculate the spectral statistic of each mesh image as a feature amount. Then, a class may be determined as chip information for each mesh image based on the magnitude relationship between the feature amount and a threshold preset as a determination parameter.

FFT has high environmental dependency. If a small screw hole other than the chips, a drop of the coolant, or the like is included in the mesh image, high frequency components increase and erroneous determination is readily made. To cope with this, an area image in a state in which there are no chips may be prepared in advance, and a difference image between the prepared area image and the determination target area image may undergo mesh division and FFT, thereby eliminating environment-dependent components.

In this example embodiment, the chip information determiner 46 determines chip information using the single algorithm. The present invention, however, is not limited to this, and chip information may be comprehensively determined based on the determination results obtained by a plurality of algorithms.

Note that if the mesh size selector 44 selects a plurality of mesh sizes, the chip information determiner 46 executes determination for all the mesh sizes. Then, the chip information for each mesh size is stored as a determination result in the determination result storage unit 33.

The cleaning necessity determiner 47 determines, for each mesh image, whether chip cleaning is necessary. In this example embodiment, the cleaning necessity determiner 47 compares the chip information of each mesh image stored in the determination result storage unit 33 with the cleaning condition stored in the cleaning condition storage unit 34. Then, the cleaning necessity determiner 47 determines, for the mesh image satisfying the cleaning condition, that cleaning is necessary.

The cleaning processor 48 controls the cleaner 13 to clean the chips. In this example embodiment, the cleaning processor 48 calculates the position (the actual position in the machine tool 10) of a mesh area corresponding to the mesh image for which it is determined that cleaning is necessary, and ejects the cleaning liquid from the cleaner 13 toward the mesh area.

Note that the position of the mesh area can be specified by, for example, making an image memory (not shown) for storing an area image correspond to the coordinate system in the machine tool 10. In this example embodiment, since the cleaner 13 is formed by the programmable nozzle, it ejects the coolant liquid to all the mesh areas for which it is determined that cleaning is necessary while changing the ejection direction.

In this example embodiment, every time a cleaning operation is executed, the cleaning processor 48 updates the continuous cleaning count as the number of times of continuous cleaning in the target area and the local continuous cleaning count as the number of times of continuous cleaning of the same mesh area, both of which are stored in the cleaning count storage unit 35. Then, the cleaning processor 48 performs cleaning if the continuous cleaning count and the local continuous cleaning count are smaller than predetermined thresholds. On the other hand, if at least one of the continuous cleaning count and the local continuous cleaning count reaches the corresponding predetermined threshold, predetermined processing for abnormality is executed to avoid the situation in which the automatic cleaning operation never ends.

The processing for abnormality is not particularly limited as long as it is processing for avoiding the situation in which the automatic cleaning operation never ends. For example, the operation of the machine tool 10 may be stopped and an alarm notification may be made. Alternatively, while recording and making a notification that the threshold is reached, cleaning of the mesh area may be interrupted only during a "cleaning interruption period" preset by the user and cleaning of other mesh areas and the operation of the machine tool 10 may be continued.

Note that the threshold of the continuous cleaning count and that of the local continuous cleaning count are configured to be individually settable by the user. An example of a method of making the alarm notification is a method of outputting a warning sound from a loudspeaker (not shown) but is not limited to this as long as it is possible to notify the user of the alarm. More specifically, the display input unit 2 may display a message or the light (not shown) may be flickered/turned on. Furthermore, if there is no user in the periphery of the machine tool 10, the portable terminal of the user or the like may be notified of an error message.

Figure 8A:
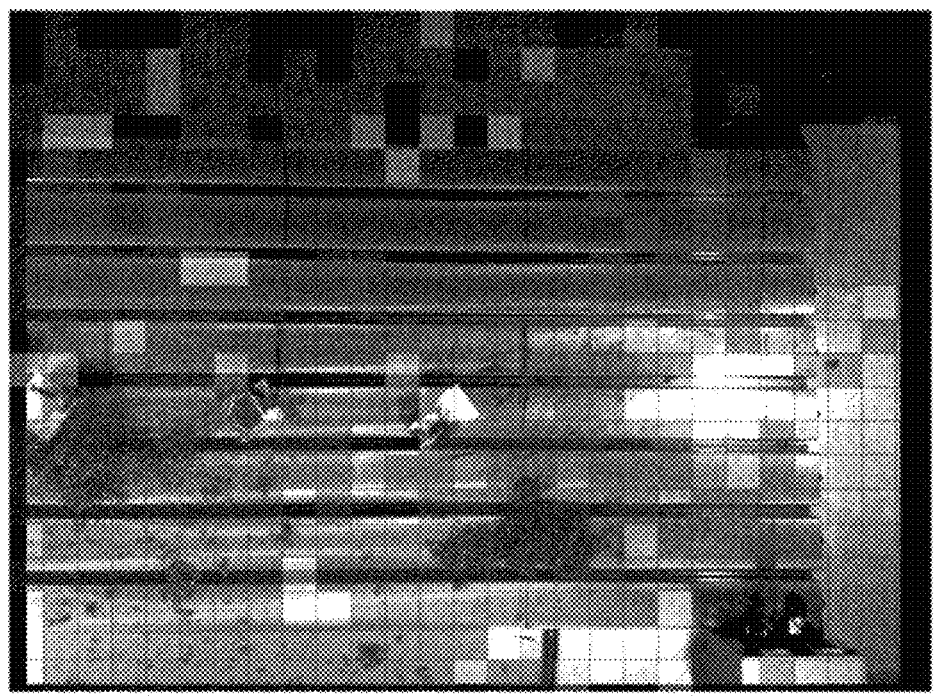
FIG. 8A shows views of examples of a display screen showing a determination result before correction.

The teaching processor 49 confirms/corrects the determination result of the chip information determiner 46. In this example embodiment, the teaching processor 49 reads out the determination result of each mesh image from the determination result storage unit 33, and displays it on the display input unit 2, as shown in FIG. 8A. More specifically, different coloring is performed for each different determination result, and each mesh image is displayed to be identifiable.

Note that when displaying the determination result, the chip information determiner 46 is caused to calculate determination probabilities for each mesh image, and a mesh image whose determination probabilities of all the classes are not so high is considered as a mesh image for which the determination result is highly probably wrong (there is no confidence about the determination result), and is highlighted, thereby assisting the user in performing a correction operation. For example, in an example shown in FIG. 8A, the mesh images are classified into the following four groups based on the values of the determination probability P0 of class 0 (the absence of chips) and the determination probability P1 of class 1 (the presence of chips).

P1 falls within the range of 0% to 30% (P0 falls within the range of 70% to 100%): "confident" of class 0 (the absence of chips)

P1 falls within the range of 30% to 50% (P0 falls within the range of 50% to 70%): "unconfident"

P1 falls within the range of 50% to 70% (P0 falls within the range of 30% to 50%): "unconfident"

P1 falls within the range of 70% to 100% (P0 falls within the range of 0% to 30%): "confident" of class 1 (the presence of chips)

Figure 8B:
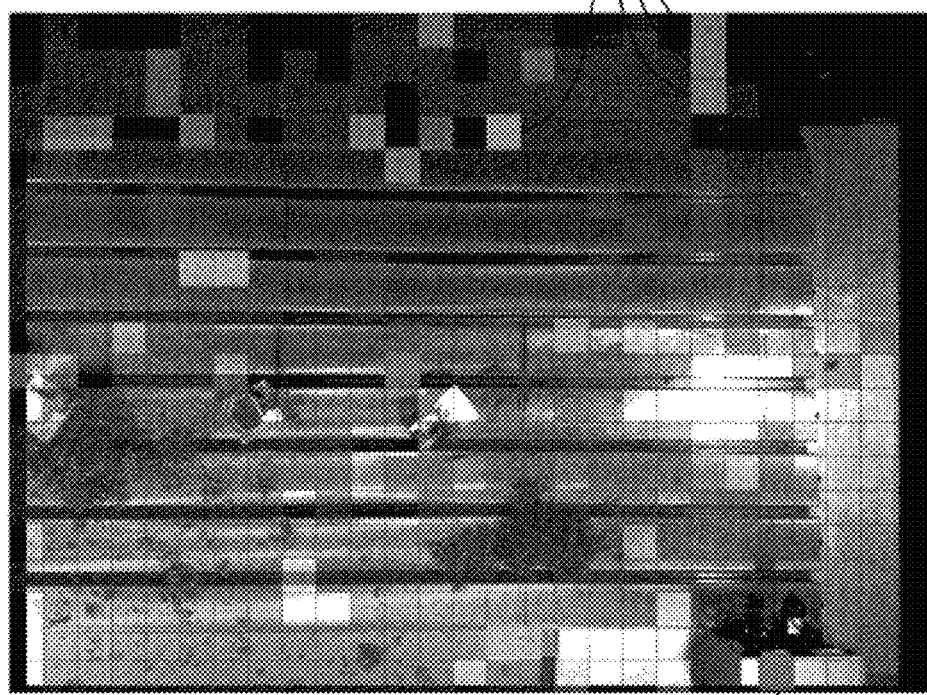
FIG. 8B shows views of examples of a display screen showing a determination result after correction in a teaching mode according to the example embodiment.

Next, if the user who has confirmed the above determination results selects, by a touch, an arbitrary mesh image erroneously determined, and inputs chip information as a correct determination result, the teaching processor 49 acquires the determination result, and corrects the determination result stored in the determination result storage unit 33. Then, as shown in FIG. 8B, the display input unit 2 is caused to display the corrected determination results.

The additional learning unit 50 performs additional learning using new supervised data. In this example embodiment, the additional learning unit 50 causes the chip determination model to additionally learn supervised data formed from the determination result (correct chip information) corrected by the teaching processor 49 and the mesh image, thereby acquiring a learning parameter on which the correct determination result is reflected. Then, the learning parameter is used as a new determination parameter to update the determination parameter stored in the determination parameter storage unit 32.

Note that in this example embodiment, the additional learning unit 50 is provided in the local chip detection apparatus 1, and additional learning is executed in the background. The present invention, however, is not limited to this. That is, supervised data may be uploaded to a learning server on the network to execute additional learning, and an obtained learning parameter may be downloaded and used as a new determination parameter.

In this example embodiment, as operation modes of cleaning processing by the chip detection apparatus 1, an automatic cleaning mode and a teaching mode are prepared, and it is configured to be able to set one of the operation modes. The automatic cleaning mode is a mode of automatically executing cleaning processing using the determination result of the chip information determiner 46 directly. The teaching mode is a mode of executing cleaning processing using the determination result corrected by the teaching processor 49.

Figure 9:
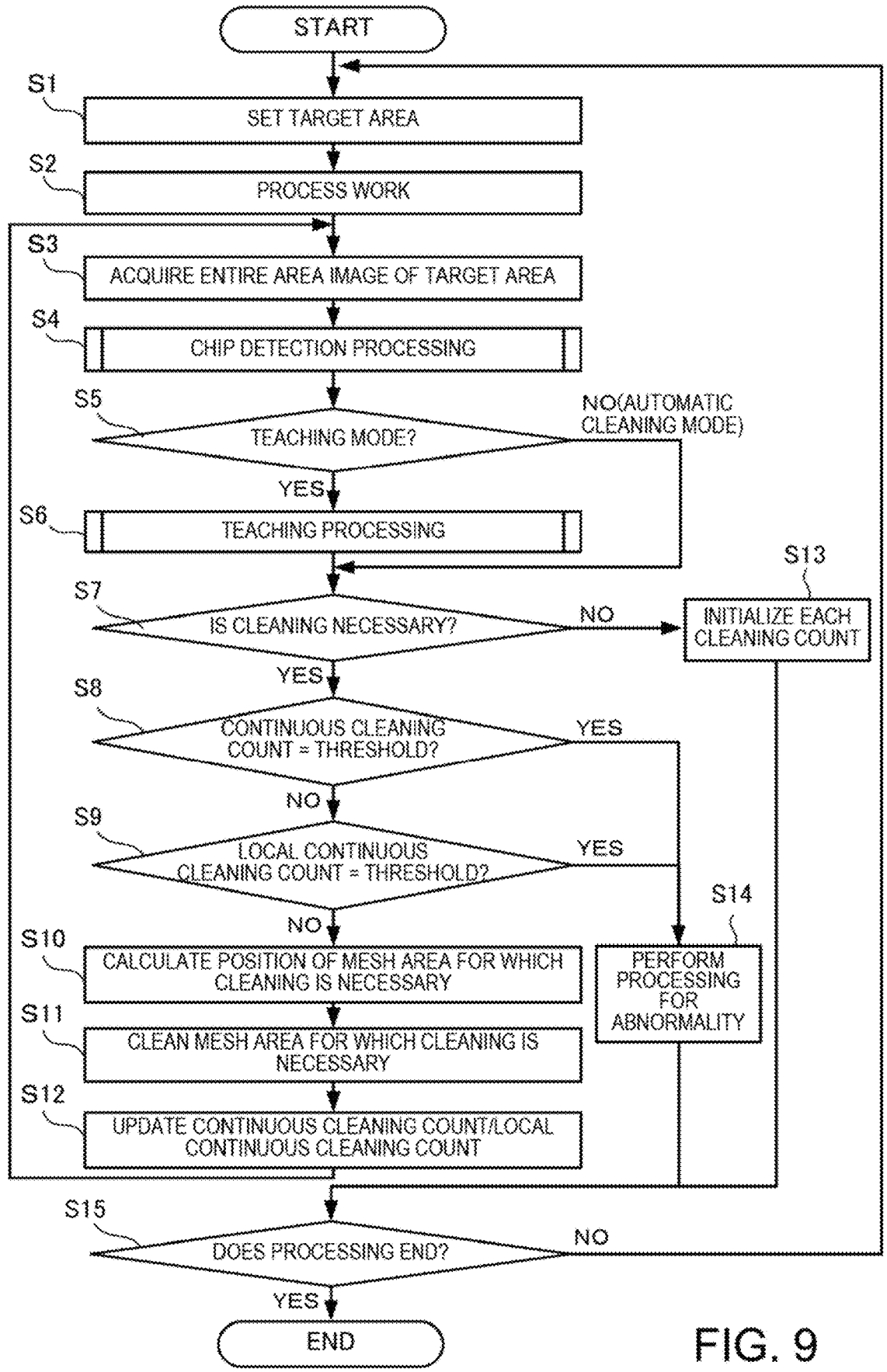
FIG. 9 is a flowchart illustrating a chip detection method executed by the chip detection apparatus according to the example embodiment.

Next, the operations of the chip detection apparatus 1 and the machine tool 10 including it and the chip detection method according to this example embodiment will be described with reference to FIG. 9. Note that a case in which chips are detected and then cleaned will be described below.

If the chip detection apparatus 1 of this example embodiment and the machine tool 10 including it are used to detect chips, the determination parameter is stored in advance in the determination parameter storage unit 32. At this time, one or a plurality of sample images obtained by capturing the chips are prepared, and the sample image is divided in a predetermined mesh size. This acquires a number of mesh images as supervised data for causing the chip determination model to perform learning. Then, the chip determination model is caused to learn the supervised data, and the optimized determination parameter is stored in the determination parameter storage unit 32.

Note that like the chip detection apparatus 1 of this example embodiment, the system using machine learning needs to prepare in advance many supervised data for the learning model before operation and cause the learning model to perform learning. However, the operation of preparing the supervised data needs much effort and time, which is a barrier to introduction.

The supervised data used in this example embodiment includes a mesh image and its class, and a large amount of supervised data is required to obtain performance and flexibility to some extent. However, it is easy to prepare the supervised data for the following reasons. (1) Many mesh images as learning units can be obtained from one area image. (2) Even for the same area image, different supervised data can easily be increased by only performing simple processing, for example, by only shifting or rotating the division boundaries of mesh images. (3) An object detection algorithm such as Object Detection or Semantic Segmentation needs position information of all chips included in the area image. In contrast to this, in this example embodiment, it is unnecessary to specify the correct positions of chips in the area image by dividing the area image in a mesh size necessary and sufficient to perform cleaning, resulting in simple class classification. (4) If class classification is used as chip information, supervised data are created in which one numerical value (class) is assigned to each mesh image.

This can input supervised data for detecting the chips under at least a specific environment by only capturing a few area images. That is, it is possible to perform optimization for an individual machine, environment, or processing by a relatively small number of teaching operations.

Subsequently, to detect the chips, the target area setting unit 41 sets a target area where the chips are to be detected (step S1), and then the driving controller 42 controls the machine tool 10 to process a work (step S2). Since this scatters the chips on the table 12 and the work, as shown in FIG. 1, the image data acquirer 43 acquires an area image of the target area from the image capturer 11 (step S3).

Figure 10:
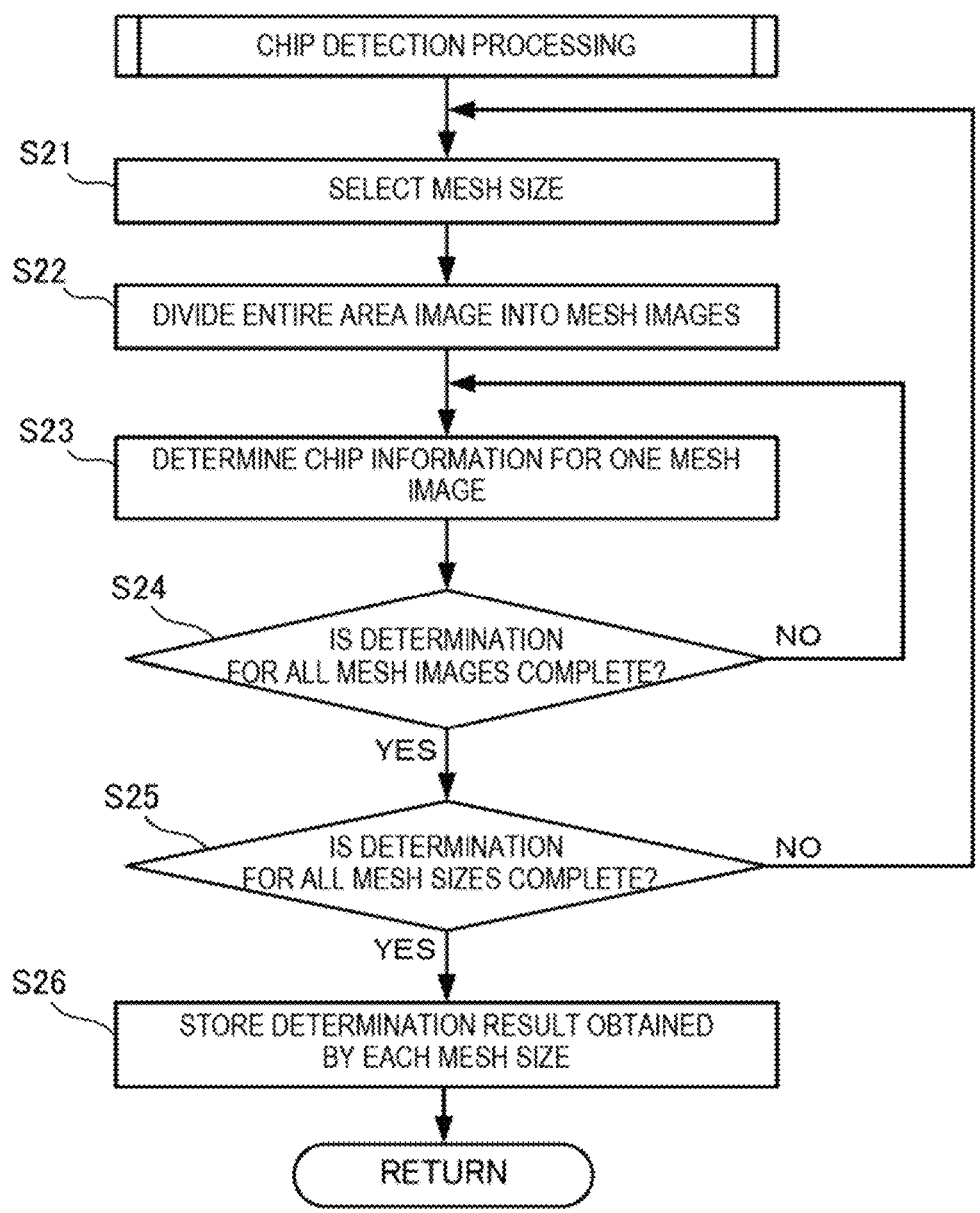
FIG. 10 is a flowchart illustrating chip detection processing according to the example embodiment.

After acquiring the area image, chip detection processing according to the present invention is executed (step S4). The chip detection processing in step S4 will be described below with reference to FIG. 10.

In the chip detection processing, the mesh size selector 44 selects a mesh size (step S21). In this example embodiment, the mesh size selector 44 selects one or a plurality of candidates which are considered to correspond to a mesh size such that the shapes of the chips can be recognized and such that the edge shapes of the work and jig as the background of the chips are simplified. This makes it easy to discriminate the chips from the background and suppresses erroneous detection, thereby improving the detection accuracy.

Next, the mesh divider 45 divides the area image into a plurality of mesh images in one mesh size selected by the mesh size selector 44 (step S22). Thus, when using chip information, it is only necessary to specify a mesh area corresponding to each mesh image, and it is unnecessary to specify the correct positions of all the chips. Therefore, a calculation amount for detection of the chips is largely reduced.

Furthermore, in this example embodiment, if a plurality of partial images are composited to acquire the area image, the mesh divider 45 executes the processing of (i) or (ii) described above in accordance with whether there is an overlapping portion in the boundary portion between the partial images. This prevents a plurality of different partial images from being mixed in the same mesh image. Therefore, erroneous detection caused by a difference in brightness between the partial images, a positional shift, or the like is reduced.

Subsequently, the chip information determiner 46 determines chip information for one mesh image (step S23), and repeats this processing until determination for all the mesh images within the target area is completed (NO in step S24). Thus, it is only necessary to determine chip information for the mesh images divided in the predetermined mesh size, thereby simplifying the chip detection processing and improving its accuracy.

Upon completion of determination for all the mesh images within the target area (YES in step S24), the chip information determiner 46 determines whether determination for all the mesh sizes within the target area is complete (step S25). If there is a mesh size for which determination has not been performed yet (NO in step S25), the process returns to step S21, and repeats the division processing (step S22) using the mesh size and the determination processing (step S23).

On the other hand, if determination for all the mesh sizes is complete (YES in step S25), the chip information determiner 46 stores the determination result obtained by each mesh size in the determination result storage unit 33 (step S26), thereby ending this processing.

Subsequently, referring back to FIG. 9, it is determined whether the operation mode is set to the teaching mode (step S5). If the operation mode is set to the automatic cleaning mode (NO in step S5), the process advances to step S7 (to be described later). On the other hand, if the operation mode is set to the teaching mode (YES in step S5), the teaching processor 49 executes teaching processing (step S6). The teaching processing in step S6 will be described below with reference to FIG. 11.

In the teaching processing, the teaching processor 49 displays the determination result on the display input unit 2 (step S31), and accepts selection of a mesh image by the user. At this time, if there are determination results for a plurality of mesh sizes, the user is prompted to visually select an optimum mesh size, and this mesh size is used to improve the determination accuracy of chip information. Next, it is determined whether any one of the mesh images is selected (step S32). If no mesh image is selected (NO in step S32), selection of a mesh image is accepted unless the teaching mode ends (NO in step S36).

On the other hand, if the user selects any one of the mesh images (YES in step S32), the teaching processor 49 prompts the user to input correct chip information about the selected mesh image, and acquires the chip information as a determination result (step S33). This stores, in the determination result storage unit 33, the correct determination result visually confirmed/corrected by the user (step S34), and displays the determination result on the display input unit 2 (step S35).

After that, if it is instructed to end the teaching mode (YES in step S36), the additional learning unit 50 starts additional learning in the background at a predetermined timing, and acquires the determination parameter on which the corrected determination result is reflected while updating the determination parameter in the determination parameter storage unit 32 by the acquired determination parameter (step S37). By executing the above-described teaching processing, the accuracy of the determination result is improved and the determination parameter is updated for an individual machine, environment, or processing to optimize the chip determination performance.

Next, referring back to FIG. 9, after executing the teaching processing (step S6) or if the automatic cleaning mode is set (NO in step S5), the cleaning necessity determiner 47 determines whether chip cleaning is necessary (step S7). In this example embodiment, since a cleaning condition is set by combining the chip information and the position of the mesh area, cleaning processing is executed efficiently in accordance with the amount and positions of the detected chips.

For example, a cleaning condition may be set to clean only a mesh area corresponding to a mesh image determined to belong to class 2 (many chips) among the above-described three classes or a cleaning condition may be set not to clean an area outside the table 12. By setting such cleaning condition, the time taken for cleaning and the consumption of the cleaning liquid are suppressed.

If, as a result of the determination processing in step S7, cleaning is unnecessary (NO in step S7), the cleaning processor 48 initializes the continuous cleaning count and the local continuous cleaning count (step S13). Then, unless a processing end instruction is issued (NO in step S15), the process returns to step S1 and repeats the subsequent processes. This can process the work in a state in which the chips are removed.

On the other hand, if, as a result of the determination processing in step S7, cleaning is necessary (YES in step S7), the cleaning processor 48 determines whether the continuous cleaning count reaches the predetermined threshold (step S8). If, as a result of the determination processing, the continuous cleaning count reaches the predetermined threshold (YES in step S8), the cleaning processor 48 executes the processing for abnormality without performing a cleaning operation (step S14). This avoids a case in which the automatic cleaning operation never ends by repeating a case in which chips that should have been cleaned only move to another mesh area and are not actually removed.

Even if, as a result of the determination processing in step S8, the continuous cleaning count is smaller than the threshold (NO in step S8), the cleaning processor 48 additionally determines whether the local continuous cleaning count reaches the predetermined threshold (step S9). Even if, as a result of the determination processing, the local continuous cleaning count reaches the threshold (YES in step S9), the cleaning processor 48 executes the processing for abnormality without performing a cleaning operation (step S14). This avoids a case in which an attempt is made several times to clean chips that are difficult to remove by cleaning because they stick or are caught to the work or the like and a case in which a screw of the jig, a contamination in the machine, or the like is erroneously detected as a chip and an attempt is endlessly made to clean it.

On the other hand, if both the continuous cleaning count and the local continuous cleaning count are smaller than the thresholds (NO in step S8 and NO in step S9), the cleaning processor 48 calculates a mesh area corresponding to each of the mesh images for which it is determined that cleaning is necessary (step S10), and the cleaner 13 cleans each mesh area (step S11). This automatically and efficiently cleans the chips in accordance with the chip information. In addition, since only the mesh areas that require cleaning are cleaned, the ejection amount of the cleaning liquid is suppressed, as compared to a case in which the inside of the whole machine is cleaned, which is economical and eco-friendly.

Finally, after the cleaning processor 48 updates each of the continuous cleaning count and the local continuous cleaning count stored in the cleaning count storage unit 35 (step S12), the process returns to step S3, and repeats the subsequent processes. Thus, the chip information is determined and cleaning corresponding to the cleaning condition is executed unless both the continuous cleaning count and the local continuous cleaning count reach the thresholds.

Note that in this example embodiment, if a processing end instruction is issued (YES in step S15), this processing ends.

According to the above-described chip detection apparatus 1, chip detection program 1a, and chip detection method of this example embodiment, it is possible to obtain the following effects. 1. It is possible to easily and accurately detect chips produced when processing a work by the machine tool 10. 2. It is possible to accurately detect the chips using machine learning. 3. It is possible to easily detect the chips using the feature amount of an image. 4. It is possible to optimize the determination parameter in accordance with the use environment or individual processing, thereby improving the chip detection performance. 5. It is possible to reduce the influence by the background of the chips, thereby suppressing erroneous detection. 6. It is possible to suppress erroneous detection when a plurality of partial images are composited and used as an area image. 7. It is possible to automatically and efficiently clean the chips in accordance with the chip information. 8. It is possible to perform efficient cleaning in accordance with the amount and positions of the detected chips. 9. It is possible to prevent the cleaning operation from being repeated endlessly due to erroneous detection of a chip or the like.

Note that the chip detection apparatus 1, the machine tool 10 including it, and the chip detection method according to the present invention are not limited to the above-described example embodiment, and can be changed appropriately.

For example, in the above-described example embodiment, the chips are cleaned using the chip information. The present invention, however, is not limited to this, and the chip detection apparatus 1 need not have the cleaning function. If no chip cleaning function is provided, the cleaning condition storage unit 34, the cleaning count storage unit 35, the cleaning necessity determiner 47, and the cleaning processor 48 are unnecessary, and the processes in steps S7 to S14 in the flowchart shown in FIG. 9 are unnecessary.

Note that the chip information is considered to be used in various scenes in addition to being used as information for cleaning the chips. For example, if a mesh area where a large amount of chips readily accumulates or chips often accumulate can be specified by the chip information, the chip information is used as reference information when setting a cleaning condition of, for example, cleaning the mesh area early or always cleaning the mesh area. Similarly, the chip information is considered to be used when the vendor of the machine tool performs machine design, based on the information of the mesh area where chips readily accumulate, so that chips are difficult to accumulate.

Figure 11:
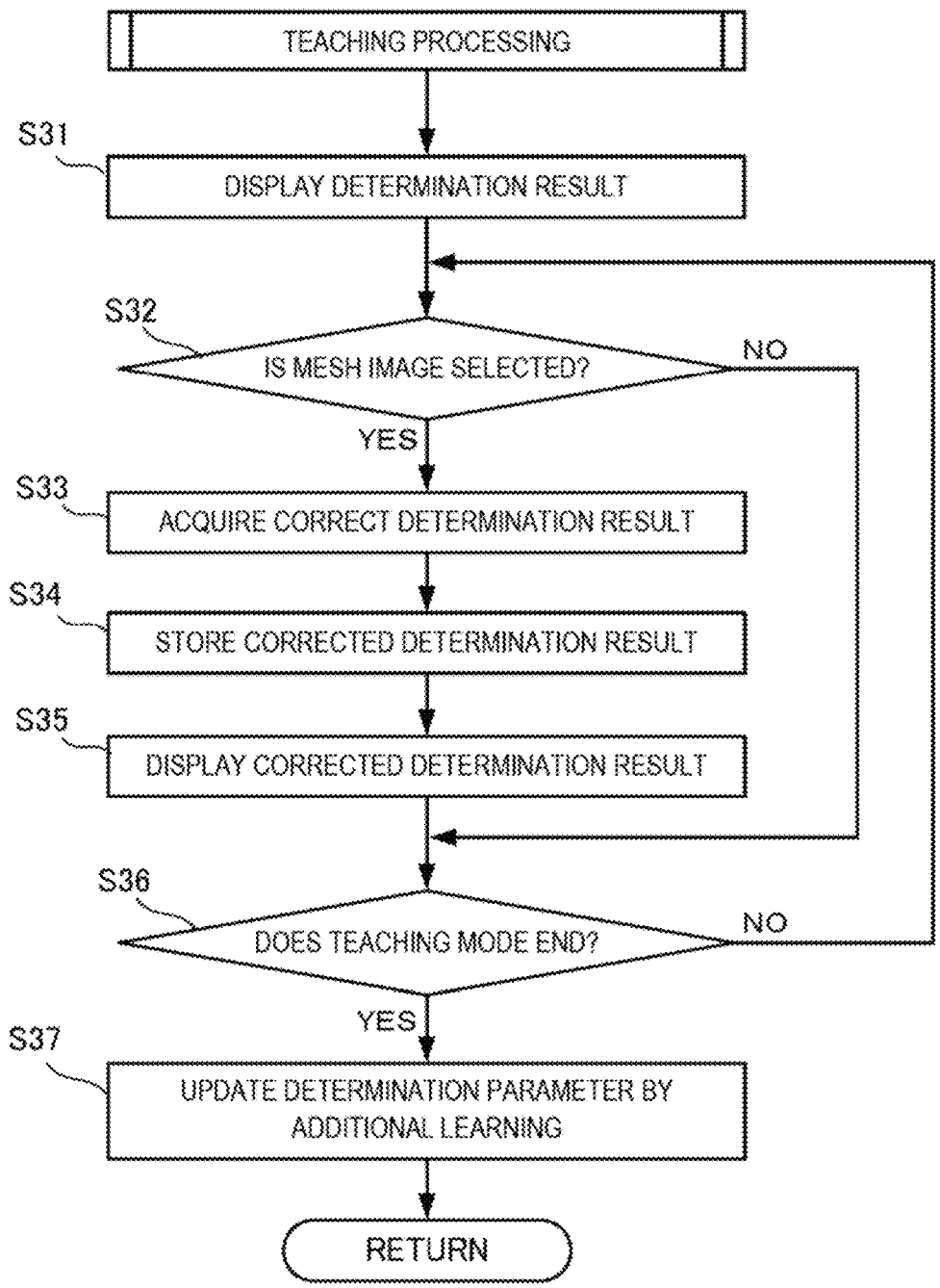
FIG. 11 is a flowchart illustrating teaching processing according to the example embodiment.

In the above-described example embodiment, the chip detection apparatus 1 has the teaching mode but this is not essential. If the teaching mode is unnecessary, the teaching processor 49 need not be provided, and the processes in steps S5 and S6 in the flowchart shown in FIG. 9 are unnecessary. The teaching processing shown in FIG. 11 is also unnecessary.

In the above-described example embodiment, the cleaning operation is controlled using both the continuous cleaning count and the local continuous cleaning count. The present invention, however, is not limited to this, and only one of the counts may be used to control the cleaning operation. In this case, in the flowchart shown in FIG. 9, one of the processes in steps S8 and S9 becomes unnecessary.

In the above-described example embodiment, the learning parameter is used as the determination parameter. The present invention, however, is not limited to this, and a threshold for classifying the chip information based on various feature amounts of a mesh image may be used. The feature amounts are not particularly limited as long as they can represent the features of a chip. Various feature amounts used for image processing, such as the complexity of edge components in the mesh image, the ratio of linear components to the edge components in the mesh image, the brightness of the mesh image, and luminance statistics, can be used.

Note that the threshold as the determination parameter may be set by performing optimization by, for example, calculating the scores of the feature amounts for each of the mesh images obtained by dividing the sample image, and aggregating the scores based on classification of the chip information, or may be set by combining a plurality of feature amounts.

In the above-described example embodiment, the "class" indicating the ease of chip cleaning is determined as the chip information. The present invention, however, is not limited to this, and the presence/absence of chips, an amount of chips, the shapes of chips, the type of chips, a combination thereof, or the like may be determined. For example, if the amount and shapes of chips are determined as chip information, a cleaning condition of cleaning the chips, whose shapes are difficult to clean, even in a mesh area where the amount of chips is small, can be set.

Furthermore, in the above-described example embodiment, the chip detection apparatus 1 is configured to locally, additionally learn new supervised data. The present invention, however, is not limited to this, and supervised data may be transmitted to a learning apparatus connected to the chip detection apparatus 1 via a network to perform additional learning. Supervised data for additional learning may be collected from a plurality of chip detection apparatuses 1 to a learning apparatus to perform additional learning, and then a thus obtained learning parameter (determination parameter) may be shared, thereby improving flexibility.

Figure 12:
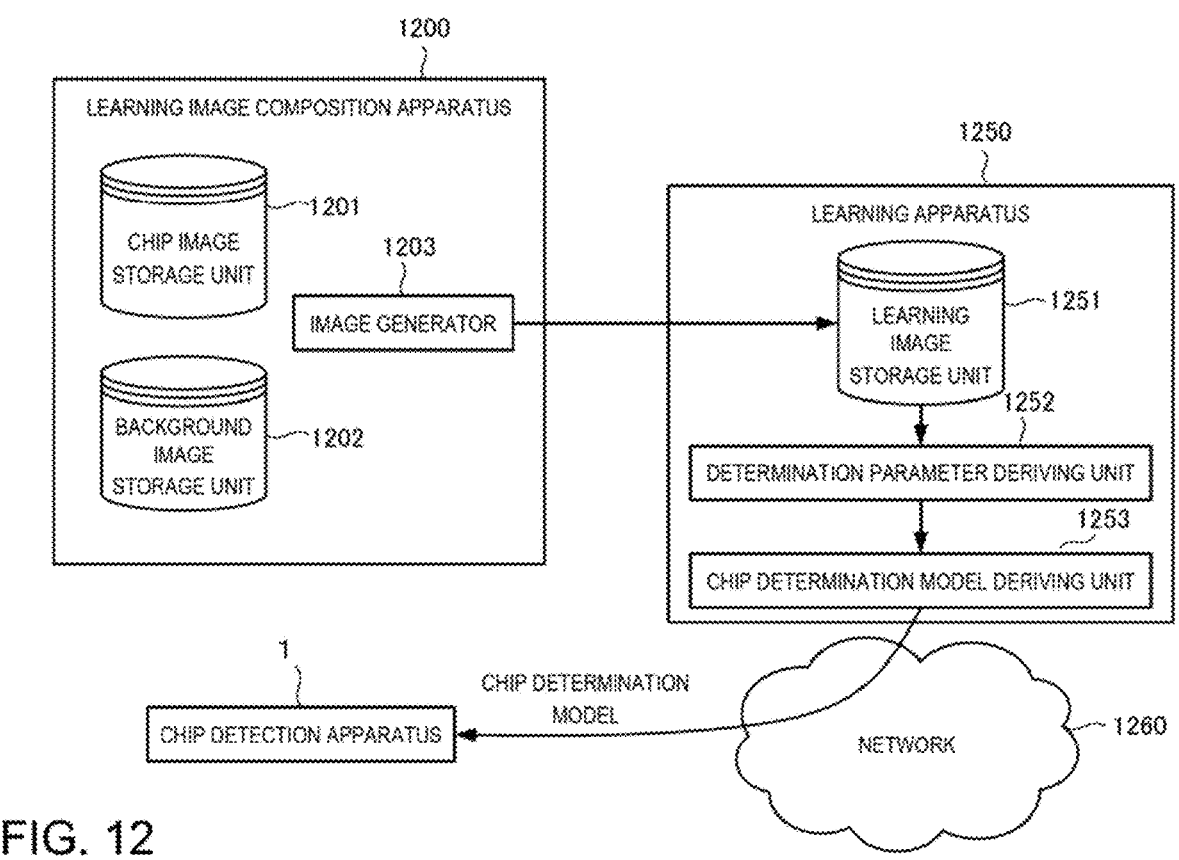
FIG. 12 is a block diagram showing the arrangement of a learning image composition apparatus according to the example embodiment.

A learning image for deriving a determination parameter to be used by the above-described chip detection apparatus 1 may be generated by a learning image composition apparatus 1200 shown in FIG. 12. The learning image composition apparatus 1200 includes a chip image storage unit 1201 that stores chip images representing various chips, and a background image storage unit 1202 that stores background images obtained by capturing the inside of various machines. The learning image composition apparatus 1200 further includes an image generator 1203 that generates a learning image by randomly compositing the chip image and the background image.

The chip image may be a captured image obtained by capturing an actual chip without any background. The background image may be a captured image obtained by actually capturing the inside of the machine. The image generator 1203 creates a plurality of environment patterns by randomly compositing the chip images with a photograph of the inside of the machine as if the chips were actually scattered as much as possible, thereby automatically generating many learning supervised data. This can prepare learning data easily.

The image generator 1203 creates a flaw or the like for the background image. Patterns as many as possible are prepared.

The learning image generated by the learning image composition apparatus 1200 is provided to a learning apparatus 1250, and stored in a learning image storage unit 1251. Then, a determination parameter deriving unit 1252 uses the learning image to derive a determination parameter. The determination parameter is provided to a chip determination model deriving unit 1253 and used to generate a chip determination model.

The learning image composition apparatus 1200 may provide the chip determination model to the chip detection apparatus 1 via a network 1260.

Note that the learning image composition apparatus 1200 and the learning apparatus 1250 may be provided in the chip detection apparatus 1. In this case, however, the chip detection apparatus 1 needs to have resources such as a high-speed GPU.

Furthermore, the actual image of the inside of the machine tool may be sent to the learning image composition apparatus 1200 via the network 1260 and stored in the background image storage unit 1202. In this case, it is possible to generate more accurate supervised data (learning image).

The chip image storage unit 1201 preferably stores images of various chips of different colors, shapes, and sizes. Furthermore, the chip image storage unit 1201 preferably stores an image of a chip splashed with the coolant, and an image of a chip not splashed with the coolant.

The background images stored in the background image storage unit 1202 are classified into a region including many chips, a region including a few chips, and a region including no chips, and may be composited with the chip images by setting a different weight for each region.

The image generator 1203 may perform, for the background image, processing such as peeling off of a coating, a flaw, or a stain, and then composite the background image with the chip images. At the time of composition, each chip image may be changed in size or rotated. The image generator 1203 preferably generates a plurality of kinds of learning images by changing the color, brightness, the state of illumination, and the like of the overall image after composition.

At the time of composition, the image generator 1203 prepares correct answer data representing the presence/absence of chips for each region of a mesh image and pastes it.

The learning image composition apparatus 1200 generates very many supervised data by combining background images of various models and various chip images while variously changing weighting and density, and then applying various effects (brightness and the way of supplying mist). The learning image composition apparatus 1200 may perform classification for each model to generate learning images.

With the above arrangement, it is possible to generate supervised data very efficiently.

In the above-described example embodiment, the chip detection apparatus 1 is implemented as one function of the numerical control apparatus. The present invention, however, is not limited to this. That is, the chip detection apparatus 1 may be formed by a computer separated from the numerical control apparatus.

Note that the above description of the example embodiment is merely an example in terms of all the points and does not limit the present invention, and those skilled in the art can make modifications and changes appropriately. The scope of the present invention is indicated not by the above-described example embodiment but by the scope of claims. Furthermore, the scope of the present invention includes changes from the example embodiment within a scope equivalent to the scope of claims.

This application is based upon and claims the benefit of priority from Japanese patent application No. 2019-031127, filed on Feb. 25, 2019, the disclosure of which is incorporated herein in its entirety by reference.

The invention claimed is:

1. An information processing apparatus for detecting chips generated when a workpiece is machined by a machine tool, comprising:
    at least one processor; and
    a memory storing instructions that, when executed by the at least one processor, cause the at least one processor to:
    perform processing of dividing at least part of an area image obtained by imaging a target area where the chips are to be detected, into a plurality of mesh images having a mesh size that (i) allows analysis of edges that constitute an outline of each chip from a state in which the chips are piled up and overlapped, and (ii) simplifies analysis of background of the chips;
    input a mesh image into a chip determination model and determine chip information related to the input mesh image; and
    output a driving signal to control said machine tool based on the determined chip information.

2. The information processing apparatus according to claim 1, wherein the instructions, when executed by the at least one processor, cause the at least one processor to:
    determine chip information related to the input mesh image using a determination parameter preset for determining the chip information, wherein the determination parameter is a learning parameter obtained by prior learning using supervised data formed from a set of the mesh image and the chip information, and
    output the chip information for each of the mesh images by inputting the mesh images to the chip determination model applied with the learning parameter.

3. The information processing apparatus according to claim 2, wherein
    the determination parameter is a threshold for classifying the chip information based on a feature amount of the mesh image, and
    the chip information is output for each of the mesh images based on a magnitude relationship between the feature amount and the threshold.

4. The information processing apparatus according to claim 2, further comprising:
    a teaching processor that displays a determination result of the determined chip information on a display for each of the mesh images, and acquire, if an arbitrary mesh image is selected, a correct determination result of the mesh image to correct the determination result;
    wherein the instructions, when executed by the at least one processor, further cause the at least one processor to:
    cause the chip determination model to additionally learn supervised data formed from a set of the mesh image and the determination result corrected by said teaching processor, and acquire an obtained learning parameter as a new determination parameter.

5. The information processing apparatus according to claim 1, wherein the instructions, when executed by the at least one processor, further cause the at least one processor to select the mesh size,
    wherein the mesh size is selected based on sizes of the chips, the work, and a jig, the selected mesh size being a mesh size such that shapes of the chips can be recognized and such that edge shapes of the work and the jig as a background of the chips in the mesh image are simplified.

6. The information processing apparatus according to claim 1, wherein the instructions, when executed by the at least one processor, further cause the at least one processor to acquire the area image,
    wherein if the area image is acquired by compositing a plurality of partial images, when performing the division processing, the at least one processor is caused to execute one of
    (i) processing of making, if there is no overlapping portion in a boundary portion between each partial image and another partial image, a boundary of the mesh image coincide with a boundary of the partial image, and (ii) processing of extracting, if there is an overlapping portion in a boundary portion between each partial image and another partial image, the mesh image including the boundary portion from only one of the partial images.

7. The information processing apparatus according to claim 1, wherein the instructions, when executed by the at least one processor, further cause the at least one processor to:
determine, for each of the mesh images, based on a cleaning condition using the chip information, whether cleaning of the chips is necessary; and
said information processing apparatus further comprises a cleaning processor that calculates a position of a mesh area corresponding to the mesh image for which it is determined that cleaning is necessary, and causes a cleaning liquid from a cleaner to be ejected toward the mesh area.

8. The information processing apparatus according to claim 7, wherein a condition obtained by combining the chip information and the position of the mesh area is set as the cleaning condition.

9. The information processing apparatus according to claim 7, wherein if a continuous cleaning count as the number of times of continuous cleaning in the target area and a local continuous cleaning count as the number of times of continuous cleaning of the same mesh area are smaller than predetermined thresholds, said cleaning processor causes cleaning to be performed, and if at least one of the continuous cleaning count and the local continuous cleaning count reaches the corresponding predetermined threshold, said cleaning processor executes predetermined processing for abnormality.

10. A machine tool including an information processing apparatus defined in claim 1.

11. A learning image composition apparatus for generating a learning image for deriving a determination parameter to be provided to an information processing apparatus which includes at least one processor and a memory storing instructions that, when executed by the at least one processor, cause the at least one processor to:
divide at least part of an area image obtained by imaging a target area where the chips are to be detected inside of a machine tool, into a plurality of mesh images having a mesh size that (i) allows analysis of edges that constitute an outline of each chip from a state in which the chips are piled up and overlapped, and (ii) simplifies analysis of background of the chips;
input a mesh image into a chip determination model, determine chip information related to the input mesh image, and determine, using the determination parameter, the presence/absence of chips produced when processing a work by the machine tool, and
output a driving signal to control said machine tool based on the determined chip information,
wherein the learning image is generated by randomly compositing chip images representing the chips with a background image obtained by capturing the inside of the machine tool.

12. An information processing apparatus for detecting chips produced when processing a work by a machine tool, comprising:
at least one processor; and
a memory storing instructions that, when executed by the at least one processor, cause the at least one processor to:
perform processing of dividing at least part of an area image obtained by imaging a target area where the chips are to be detected, into a plurality of mesh images having a mesh size that (i) allows analysis of edges that constitute an outline of each chip from a state in which the chips are piled up and overlapped, and (ii) simplifies analysis of background of the chips;
input a mesh image into a chip determination model and determine chip information related to the input mesh image using a determination parameter preset for determining the chip information and a feature amount of the mesh image which is calculated by analyzing the edges of the chips in the mesh image; and
output a driving signal to control said machine tool based on the determined chip information.

* * * * *